US008340662B2

United States Patent
Shu

(10) Patent No.: US 8,340,662 B2
(45) Date of Patent: Dec. 25, 2012

(54) METHOD AND SYSTEM FOR IMPLEMENTING COMMUNICATIONS BETWEEN MULTIPLE SUBNETS AND MSC

(75) Inventor: Xuzu Shu, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 918 days.

(21) Appl. No.: 11/595,521

(22) Filed: Nov. 9, 2006

(65) Prior Publication Data

US 2007/0117561 A1 May 24, 2007

(30) Foreign Application Priority Data

Aug. 5, 2004 (CN) .................. 2004 1 00700433

(51) Int. Cl.
*H04W 40/00* (2009.01)
(52) U.S. Cl. .............. 455/428; 455/560; 455/432.1; 370/352; 370/349
(58) Field of Classification Search ............... 455/428, 455/560, 432.1, 433, 445; 370/352, 439
See application file for complete search history.

(56) References Cited

U.S. PATENT DOCUMENTS

| | | | | |
|---|---|---|---|---|
| 5,291,544 A * | 3/1994 | Hecker | ........................ | 455/436 |
| 5,946,619 A * | 8/1999 | Kolev | ........................ | 455/432.1 |
| 6,032,044 A * | 2/2000 | Shannon et al. | ............... | 455/433 |
| 6,067,452 A * | 5/2000 | Alexander | ..................... | 455/428 |
| 6,097,951 A * | 8/2000 | Ernam et al. | ................... | 455/433 |
| 6,243,582 B1 * | 6/2001 | Lahtinen | ........................ | 455/436 |
| 6,321,092 B1 * | 11/2001 | Fitch et al. | ................. | 455/456.5 |
| 6,633,755 B1 * | 10/2003 | Haumont | ....................... | 455/406 |
| 6,687,243 B1 * | 2/2004 | Sayers et al. | .................. | 370/356 |
| 2001/0002578 A1 | 6/2001 | Vollath et al. | | |

(Continued)

FOREIGN PATENT DOCUMENTS

CN 1568024 1/2005

(Continued)

OTHER PUBLICATIONS

Written Opinion of the International Searching Authority (translation) dated (mailed) Oct. 20, 2005, issued in related application No. PCT/CN2005/001202, filed Aug. 5, 2005, Huawei Technologies Co., Ltd.

(Continued)

*Primary Examiner* — Charles Appiah
*Assistant Examiner* — Alexander Yi
(74) *Attorney, Agent, or Firm* — Finnegan, Henderson, Farabow, Garrett & Dunner, LLP

(57) ABSTRACT

The present invention discloses a method and a system for implementing communications between multiple subnets covered by one physical Mobile Switching Center (MSC) and an MSC. The method includes the steps of: mapping one physical MSC to multiple logical MSCs, i.e. multiple virtual MSCs, and assigning a virtual MSC number to each virtual MSC, and setting relationship(s) between location area(s) covered by the virtual MSC and the virtual MSC number of each virtual MSC; transmitting location information of a terminal with the virtual MSC number during communications to implement communications among multiple subnets. During communication, since the terminal location is transmitted according to the virtual MSC number, it is possible to differentiate the terminals located in different subnets covered by a physical MSC, therefore the roaming and handover of the terminal between the subnets can be implemented; and the roaming limitation also can be implemented through the MSC List and VLR List.

15 Claims, 5 Drawing Sheets

U.S. PATENT DOCUMENTS

| | | | |
|---|---|---|---|
| 2001/0005678 A1 | 6/2001 | Lee | |
| 2001/0018337 A1* | 8/2001 | Donovan et al. | 455/406 |
| 2002/0196770 A1* | 12/2002 | Lin | 370/349 |
| 2003/0166403 A1 | 9/2003 | Hammer et al. | |
| 2004/0242225 A1* | 12/2004 | Wang | 455/432.1 |

FOREIGN PATENT DOCUMENTS

| | | |
|---|---|---|
| CN | 1585549 A | 2/2005 |
| JP | 10-136426 A | 5/1998 |
| JP | 2001-516172 | 9/2001 |
| JP | 2003-70043 A | 3/2003 |
| KR | 20020048506 | 6/2002 |
| KR | 1020030058102 | 7/2003 |
| KR | 1020030058102 A | 7/2003 |
| WO | WO99/23838 | 5/1999 |

OTHER PUBLICATIONS

Chinese Office Action dated (mailed) Jun. 9, 2006, issued in related Chinese application No. 2004100700443, Huawei Technologies Co., Ltd.

Series Q: Switching and Signaling—Specifications of Signaling System No. 7—ISDN user part—formats and codes, ITU-T Recommendation Q.762, International Telecommunication Union, Dec. 1999, 134 pages.

Series Q: Switching and Signaling—Specifications of Signaling System No. 7—ISDN user part—general functions of messages and signals, ITU-T Recommendation Q.762, International Telecommunication Union, Dec. 1999, 30 pages.

3G TS 29.002 v4.0.0 Technical Specification, $3^{rd}$ Generation Partnership Project; Technical Specification Group Core Network; Mobile Appication Part (MAP) specification (Release 2000), 3GPP Organisational Partners, Jun. 2000, 1217 pages.

3G TS 23.078 v4.0.0 Technical Specification, $3^{rd}$ Generation Partnership Project; Technical Specification Group Core Network; Customised Applications for Mobile network Enhanced Logic (CAMEL) Phase 3—Stage 2 (Release 4), 3GPP Organisational Partners, Mar. 2001, 421 pages.

3G TS 29.078 v4.0.0 Technical Specification, $3^{rd}$ Generation Partnership Project; Technical Specification Group Core Network; Customised Applications for Mobile network Enhanced Logic (CAMEL) Phase 3; CAMEL Application Part (CAP) specification (Release 4), 3GPP Organisational Partners, Mar. 2001, 197 pages.

3G TS 22.078 v5.0.0 Technical Specification, $3^{rd}$ Generation Partnership Project; Technical Specification Group Services and System Aspects; Customised Applications for Mobile network Enhanced Logic (CAMEL); Service description, Stage 1, (Release 5), 3GPP Organisational Partners, Oct. 2000, 63 pages.

Canadian Office Action dated (mailed) Sep. 30, 2010, issued in related Canadian Application No. 2,567,179, Huawei Technologies C., LTD (3 pages).

Indian Examination Report mailed Apr. 23, 2012, issued in related Indian Application No. 4173/chenp/2006 (1 page).

\* cited by examiner

METHOD AND SYSTEM FOR IMPLEMENTING COMMUNICATIONS BETWEEN MULTIPLE SUBNETS AND MSC

FIELD OF THE TECHNOLOGY

The present invention relates to mobile communication technologies, more particularly to a method and a system for implementing communications between multiple subnets covered by a physical Mobile Switching Center (MSC) and an MSC.

BACKGROUND OF THE INVENTION

In networking of mobile communication systems, a local area network is partitioned and set generally according to geographical locations and the number of terminals. In areas of sparse population, it is suitable to have a large local area network that covers several small subnets in order to achieve a closer access and a wide coverage. The large local area network refers to a network covered by one physical MSC, and it is partitioned into subnets based on geographical locations to obtain small local area networks.

The large local area network includes a Base Station (BS), a Base Station Controller (BSC), an MSC, a Visited Location Register (VLR) and a Home Location Register (HLR). The BS (BTS/Node B) receives and transmits wireless signals, and serves a certain area, and communicates with terminals in the area. The BTS/Node B is connected with a Base Station Controller/Radio Network Controller (BSC/RNC), which manages radio resources and controls the base station. The BSC is connected to the MSC through a Media Gateway (MGW) or directly. The MSC is mainly used for controlling the mobile calling procedure. The VLR is a database to store temporary information of terminals; and the information is needed when the MSC visits the terminal. The HLR is a database to permanently store management information of the terminals and service records of the terminals.

FIG. 1 shows a network structure which includes three subnets and is covered by one physical MSC. In FIG. 1, the MSC/VLR covers location area 1, location area 2 and location area 3; the location area 1 further includes two location zones: LAI 11 and LAI 12, the location area 2 includes one location zone: LAI 2, and the location area 3 includes one location zone LAI 3. It can be seen that the whole network includes one physical and logical MSC/VLR and one HLR that controls all the terminals in the network and generates billings and traffic statistic. The existing method of distance measurement between a calling party and a called party is implemented with the MSC/VLR number. Since there is one logical MSC/VLR, the whole large local area network uses the same MSC number. The billing and traffic statistics of terminals communicating in different small local area networks, are the same as those of terminals communicating in a small local area network.

SUMMARY OF THE INVENTION

The present invention provides a method and a system for implementing communications between multiple subnets that are covered by one physical Mobile Switching Center (MSC) and an MSC, so as to differentiate terminals that are located in different subnets covered by one physical MSC.

The present invention provides a method for implementing communications between multiple subnets that are covered by one physical MSC, including steps of:

mapping one physical MSC to multiple logical MSCs, i.e. multiple virtual MSCs, and assigning a virtual MSC number to each virtual MSC, and respectively setting a corresponding relationship between a subnet covered by a virtual MSC and the virtual MSC number of the virtual MSC;

transmitting location information of a terminal with the virtual MSC number during communications to implement communications among multiple subnets.

A system for implementing communications between multiple subnets that are covered by one physical MSC includes:

virtual MSCs, mapped from one physical MSC, respectively configured with a virtual MSC number and a corresponding relationship between a subnet covered by the virtual MSC and the virtual MSC number of the virtual MSC; wherein, the virtual MSC number is used for transmitting location information of a terminal; and the virtual MSCs implements communications between multiple subnets according to the virtual MSC number.

An MSC for implementing communications between multiple subnets that are covered by the MSC includes:

virtual MSCs, mapped from the MSC, respectively configured with a virtual MSC number and a corresponding relationship between a subnet covered by the virtual MSC and the virtual MSC number of the virtual MSC; wherein, the virtual MSC number is used for transmitting location information of a terminal; and the virtual MSCs implements communications between multiple subnets according to the virtual MSC number.

It can be seen from the scheme mentioned above that, the present invention maps one physical MSC into multiple logical MSCs, i.e. virtual MSCs, and assigns MSC numbers for them, and implements communications using the virtual MSC, transmits location information of the terminal according to the virtual MSC number during communication, thus implementing the differentiation of the terminals located in different subnets which are covered by one physical MSC.

DETAILED DESCRIPTION OF THE INVENTION

Figure 1:
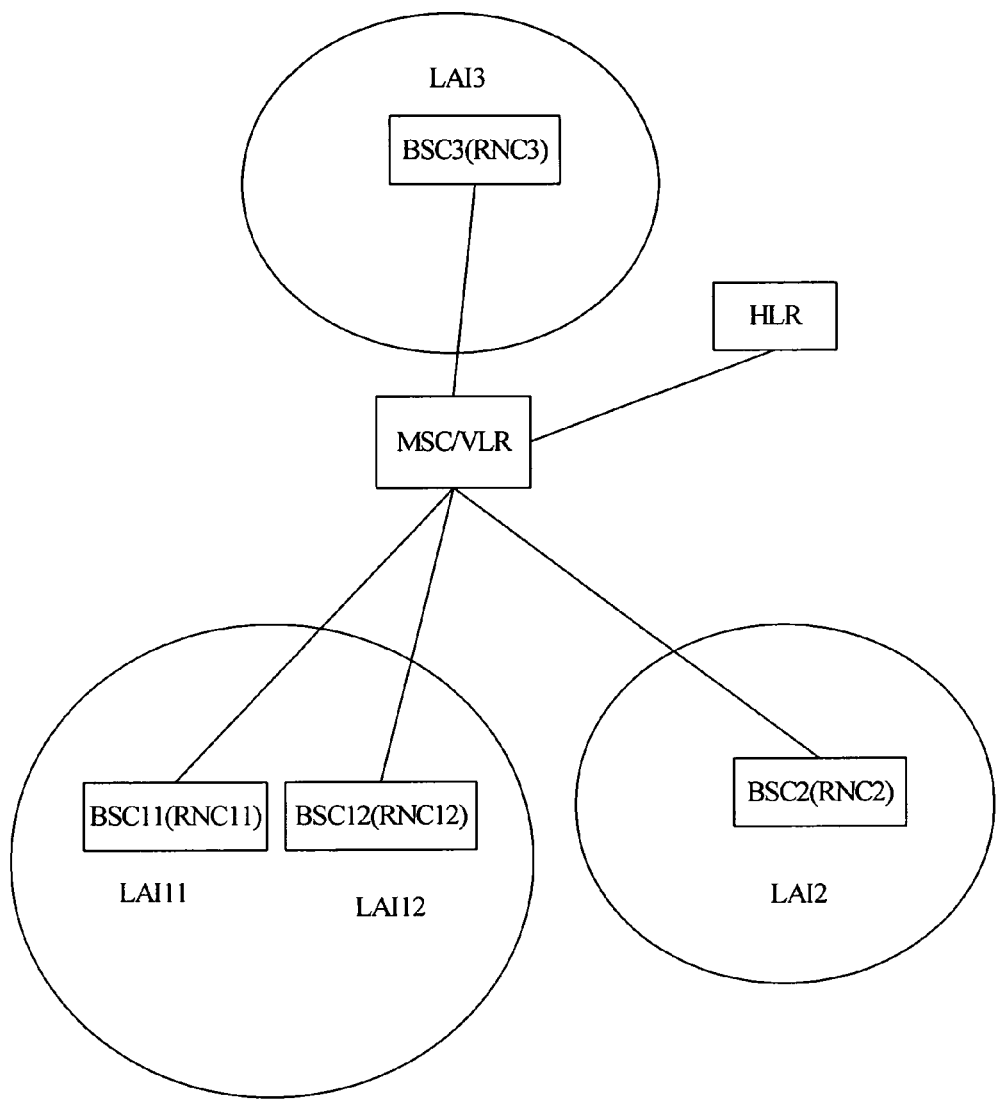
FIG. 1 is a structure diagram of the prior art.

The problem caused by the related art is it is difficult to determine which subnet the terminal currently belongs to according to the MSC/VLR number, so it is difficult to accurately bill the terminals based on the distance within the physical MSC. For example, in FIG. 1 the call made by the terminal in the location area 2 to the terminal in the location area 3 is a long-distance call, but there is one MSC number so it is impossible to detect that the communication happens between different location areas, which leads to incorrect billing and the traffic statistics, and it can not be detected that the long-distance call is made by the location area 2 to the location area 3.

Furthermore, since the same MSC number and the same VLR number are used in one physical MSC, it is difficult to implement some services, e.g. roaming limitation, etc., by setting the MSC number or VLR number. For example, since there is one MSC/VLR number, it is impossible to make sure the terminal in the location area 2 communicates within the location area 2 without roaming to other location areas by a VLR list.

To make the scheme, and the advantages of the present invention clearer, the present invention will be described in detail with reference to accompanying drawings.

A method for implementing communication between multiple subnets covered by one physical MSC is provided, mainly including the following steps: mapping one physical MSC to multiple logical MSCs, i.e. multiple virtual MSCs, and assigning a virtual MSC number to each virtual MSC, and respectively setting a corresponding relationship between a location area covered by a virtual MSC and the virtual MSC number of the virtual MSC; transmitting location information of a terminal with the virtual MSC number during communications to implement communications among multiple subnets. Furthermore, mapping one physical VLR into multiple logical and virtual VLRs, and assigning a virtual VLR number to each logical and virtual VLR; and setting relationships between the virtual MSC number and virtual VLR numbers in a system, so that each virtual MSC corresponds to one virtual VLR.

In real applications, one location area can correspond to one virtual MSC, but one virtual MSC can correspond to multiple location areas, the specific relationships can be determined according to different situations. While the relationship between the virtual MSC and the virtual VLR is: one virtual MSC corresponds to at least one virtual VLR, and one VLR can correspond to multiple MSCs.

Figure 2:
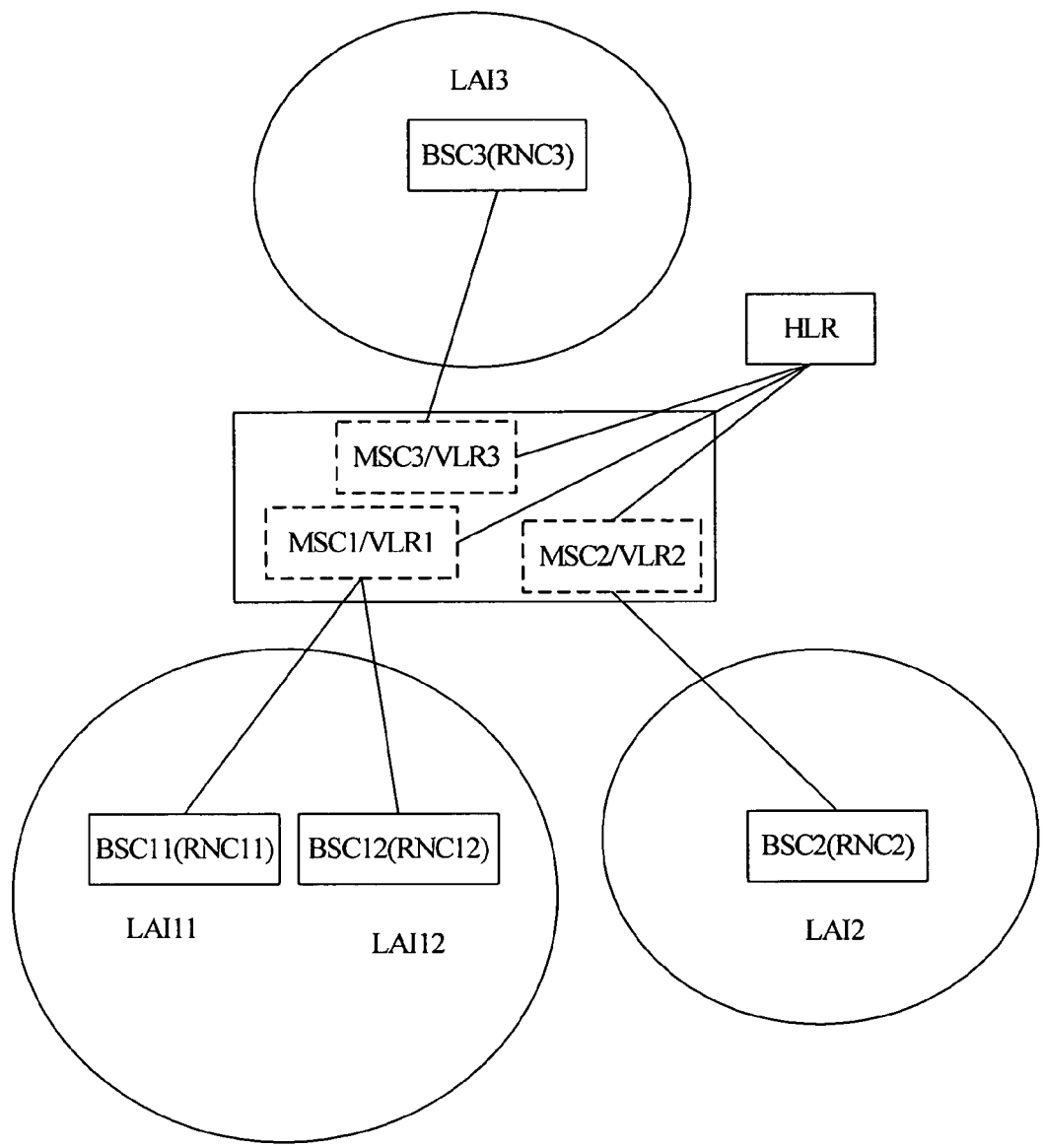
FIG. 2 is a structure diagram illustrating an embodiment of the present invention.

The first embodiment of the present invention is applied in a communication system which has the VLR number, e.g. a Global System of Mobile (GSM), Wideband Code Division Multiple Access (WCDMA). As shown in FIG. 2, in the present embodiment, one physical MSC is mapped to three virtual MSCs, i.e. MSC 1, MSC 2, MSC 3, and one VLR is mapped to three virtual VLRs, the numbers of them are: VLR 1, VLR 2, and VLR 3, respectively. The relationships among the virtual MSC number, the virtual VLR number and the location areas are set as follows: the MSC 1 corresponds to the VLR 1, the MSC 2 corresponds to the VLR 2, the MSC3 corresponds to the VLR 3, the MSC 1/VLR 1 corresponds to the location areas LAI 11 and LAI 12, the MSC 2/VLR 2 corresponds to the location area LAI 2, and the MSC 3/VLR 3 corresponds to the location area LAI 3.

After the step of mapping the multiple virtual MSCs and the multiple virtual VLRs, the involved communication process includes: location update, assigning the roaming number, assigning the handover number, etc. The communication process will be illustrated hereinafter in detail.

Figure 3:
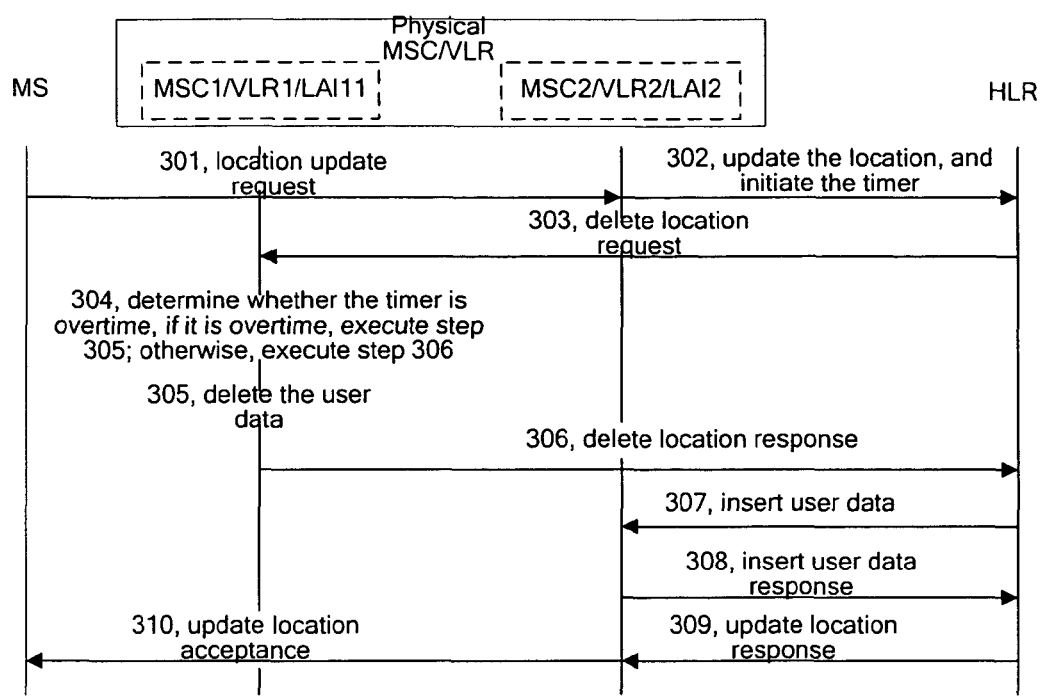
FIG. 3 is a signaling flow chart illustrating the procedure of the location update according to an embodiment of the present invention.

The location update of the terminal will be illustrated by taking the terminal roaming from the MSC 1/VLR 1/LAI 11 to the MSC 2/VLR 2/LAI 2 as an example. As shown in FIG. 3, after the terminal roams to the MSC 2/VLR 2/LAI 2, the procedure of the location update is as follows:

Step 301, the terminal sends a location update request, including the information of the original location area and the current location area, to the currently visited MSC 2/VLR 2.

Step 302, the currently visited MSC 2/VLR 2 sends the location update request to the HLR of the terminal, and initiates the visiting conflict timer for the terminal.

In this step, the MSC 2/VLR 2 determines that the original location area is the LAI 11, the current location area is the LAI 2, thus determines that the LAI 11 and the LAI 2 correspond to the MSC 1/VLR 1 and the MSC 2/VLR 2 respectively according to the relationships among the location, the virtual MSC and the virtual VLR. The MSC 2/VLR 2 sends the location update request, with the MSC 2 number and the VLR 2 number in it, to inform the HLR of the change of the MSC/VLR where the terminal locates.

Step 303, the HLR sends a delete location request to the MSC 1/VLR 1 after receiving the location update request from the MSC 2/VLR 2, requesting the MSC 1/VLR 1 to delete the user data corresponding to the terminal.

Step 304, the MSC 1/VLR 1 determines whether a visiting conflict timer is overtime after receiving the delete location request, if the timer is overtime, execute step 305; otherwise, execute step 306. Since the MSC 1/VLR 1 and the MSC 2/VLR 2 belong to the same physical MSC/VLR, the timer initiated in Step 302 is the timer in the physical MSC/VLR and the visiting conflict timer in this step.

Step 305, the MSC 1/VLR 1 deletes the user data corresponding to the terminal and sends a delete location response to the HLR, and then executes Step 307.

Step 306, the MSC 1/VLR 1 sends a delete location response to the HLR, and then executing Step 307, wherein, the MSC 1/VLR 1 keeps the user data of the terminal instead of deleting them.

Step 307, the HLR sends an insert user data request to the MSC2/VLR2 after receiving the delete location response.

Step 308, the MSC 2/VLR 2 inserts the user data corresponding to the terminal after receiving the insert user data request, and sends an insert user data response to the HLR, wherein, if the user data is not deleted in step 306, but the MSC 2/VLR 2 receives the insert user data request, then overwrite the original user data, which is not deleted by the MSC 1/VLR 1, with the new user data.

Step 309, the HLR sends the location update response to the MSC 2/VLR 2.

Step 310, the MSC 2/VLR 2 sends the location update response to the terminal.

In this procedure, if a Super-Charge technique is adopted in the network, the location update request sent by the MSC 2/VLR 2 to the HLR in step 302 includes an information element: Supper-Charge Supported in Serving Network Entity. The HLR will not initiate the delete location procedure after receiving the request, i.e. not execute step 303 to step 308, while directly execute step 309, i.e. directly send the location update response to the MSC 2/VLR 2.

The above-mentioned procedure is the location update procedure after the terminal roams to the destination location area. The procedure of assigning the roaming number after the terminal roams to the destination location area will be illustrated hereinafter.

Figure 4:
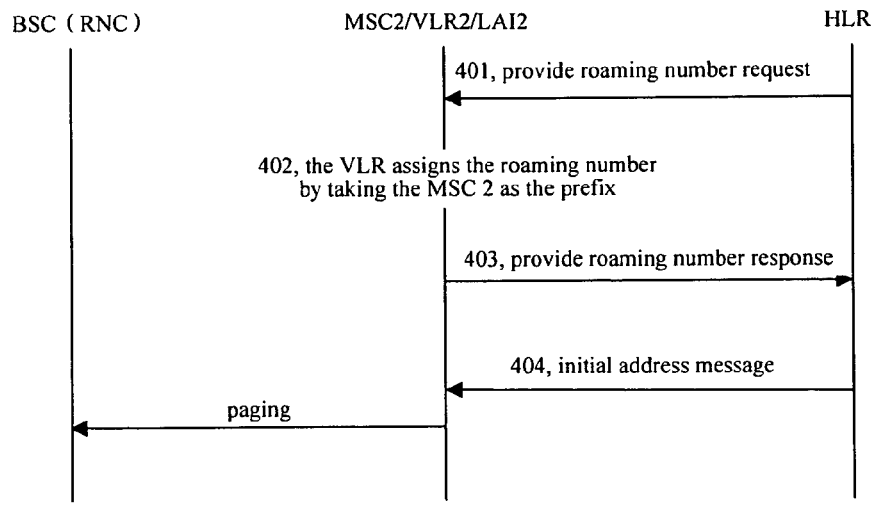
FIG. 4 is a signaling flow chart illustrating the procedure of assigning the roaming number.

When a terminal is called, the call is firstly relayed to the Gateway Mobile Switching Center (GMSC) of the terminal, then the GMSC sends a routing request to the HLR of the terminal according to the called party number; the HLR needs to assign the roaming number after receiving the routing request. The procedure of assigning the roaming number will be illustrated hereinafter by taking the roaming from the MSC 1/VLR 1 to the MSC 2/VLR 2 as an example. As shown in FIG. 4, the procedure includes following steps:

Step 401, the HLR sends a provide roaming number request to the MSC 2/VLR 2.

The provide roaming number request message includes the latest MSC number, i.e. the MSC 2 number, stored in the HLR by the called terminal, so the physical VLR can take the MSC 2 number as a prefix to assign the roaming number.

Step 402, After the MSC 2/VLR 2 receives the provide roaming number request, the physical VLR assigns a roaming number to the terminal based on the MSC 2 number.

Step 403, the MSC 2/VLR 2 sends a provide roaming number response to the HLR.

Step 404, the HLR sends an initial address message to the MSC 2/VLR 2.

Step 405, the MSC 2/VLR 2 initiates paging to the called terminal.

The roaming number of the called terminal embodies the logical MSC where the called terminal locates after assigning the roaming number, so the billing center can detect the location of the called terminal without any modification.

Figure 5:
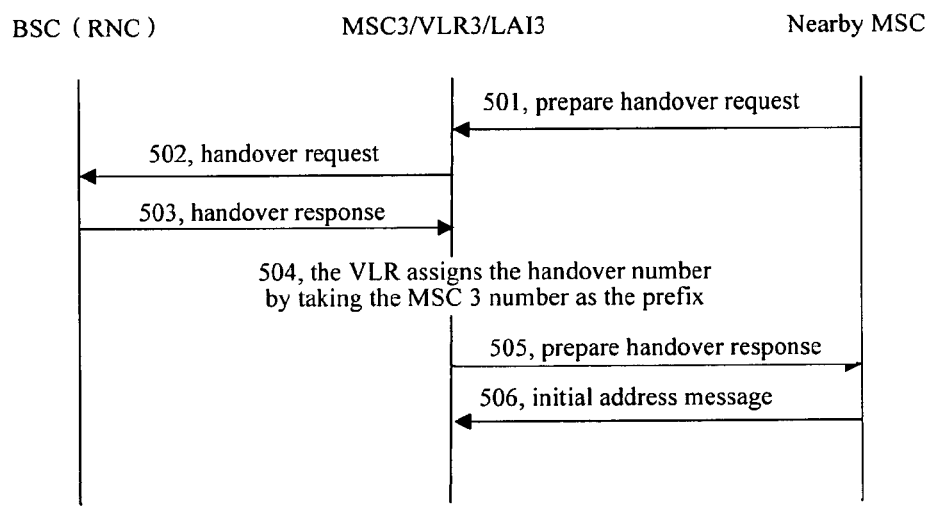
FIG. 5 is a signaling flow chart illustrating the procedure of assigning the handover number.

In addition, to implement the handover billing, the embodiment of the present invention assigns the handover number for the terminal during the handover between the physical MSC and the virtual MSC or between the virtual MSCs. For example, during a call, a terminal handover from a neighbor MSC to the virtual MSC 3, add the destination MSC number, i.e. MSC 3 number, to the prepare handover message, so the VLR can assign the handover number to the terminal based on the MSC 3 number. The specific steps are as shown in FIG. 5:

Step 501, the neighbor MSC sends a prepare handover request, including information of the destination virtual MSC, i.e. MSC 3, and information of the destination cell, to the physical MSC/VLR where the MSC 3/VLR 3 locates.

Step 502, the physical MSC/VLR sends a handover request to the Base Station Controller (BSC) that corresponds to the handover destination cell after receiving the prepare handover request.

Step 503, the BSC sends a handover response to the physical MSC/VLR.

Step 504, the MSC/VLR determines the corresponding location area according to the information of the handover destination cell, and then indexes to the virtual MSC number, i.e. the MSC 3 number, according to the location area, and takes the virtual MSC number as the prefix of the assigned handover number.

Step 505, the MSC 3/VLR 3 sends a prepare handover response to the neighbor MSC.

Step 506, the neighbor MSC sends an initial address message to the MSC 3/VLR 3.

The above-mentioned is the procedure of assigning the handover number.

In the intelligent service, when the terminal initiates the call at a roaming location, and the terminal is the calling party, the SSP reports the currently visited virtual MSC number to the SCP. The SCP can obtain exactly the roaming situation of the calling terminal according to the virtual MSC number reported by the SSP and the home MSC number of the calling terminal, and can bill according to the situation.

Figure 6:
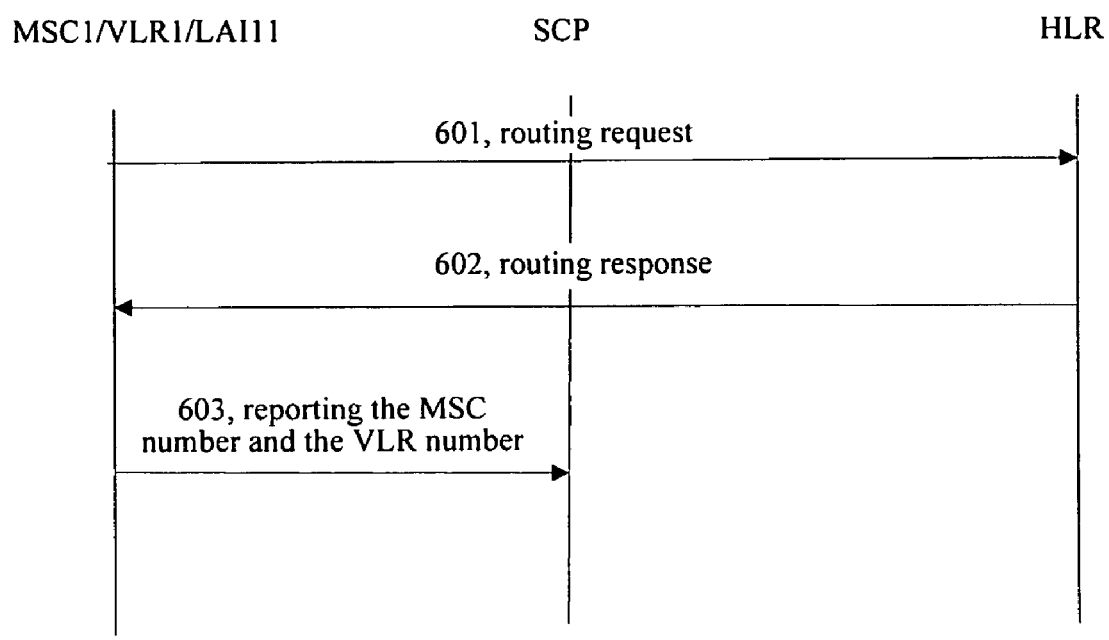
FIG. 6 is a signaling flow chart when the terminal is the called party in the intelligent service.

When the terminal is a called party and the called party is a trigger, then the problem of whether the terminal is roaming is involved. Since the terminal is determined to be roaming according to the MSC number and the VLR number, after the MSC/VLR sends the routing request to the HLR, the HLR returns the virtual MSC number and the virtual VLR number of the terminal during the location update, thus the SCP can obtain the roaming situation of the called party, and bills based on the situation. As shown in FIG. 6, the specific steps are as follows:

Step 601, the home virtual MSC of the called terminal sends an obtaining routing information request, including the called party number, i.e. the called terminal number, to the HLR.

Step 602, the HLR obtains the visited virtual MSC number and virtual VLR number of the terminal according to the called party number, and returns a routing information response, including the visited virtual MSC number and virtual VLR number of the terminal, to the home virtual MSC of the terminal.

Step 603, the home virtual MSC of the called terminal reports the visited virtual MSC number and virtual VLR number of the called terminal to the SCP.

Therefore, the SCP can bill the called terminal based on the virtual MSC number reported by the home virtual MSC.

As to the call statistic, since multiple virtual MSC/VLR numbers are adopted in a large network, the call statistic can be done according to the virtual MSC/VLR numbers, and can be differentiated by the MSC/VLR numbers, and the call statistic, roaming statistic and the handover statistic can be implemented respectively.

In this embodiment, the limitation method to the roaming terminal is also included. The limitation can be implemented with the VLR list of the terminal. For example, a local service is provided in the urban area of the city (MSC 1/VLR 1), it is necessary to make sure the terminal apply the local service in the rural area (MSC 2/VLR 2 or MSC 3/VLR 3). This can be done through the following steps: when the terminal initiates the location update request after roaming to the rural area, the HLR will know the virtual VLR number of the rural area, as seen in the location update procedure, the HLR compares the virtual VLR number with the VLR list of the terminal, determining that the virtual VLR number is not in the contracted services, therefore the service of the terminal in this area is limited.

The second embodiment of the present invention is in the communication system without the VLR number. Since the VLR number is only involved in the procedure of location update and the roaming limitation, the majority of this embodiment is the same as those in the first embodiment, only the procedures of location update and the roaming limitation are different, which will be described hereinafter.

In the procedure of the location update, the difference between this embodiment and the first embodiment is that: in Step 302 of the first embodiment, the location update request sent by the MSC2/VLR2 to the HLR includes the virtual MSC2 number.

In the procedure of the roaming limitation, operators can limit the service of the terminal through the MSC List. For example, a local service is provided in the urban area of the city (MSC 1/VLR 1), it is necessary to make sure the terminal apply the local service in the rural area (MSC 2/VLR 2 or MSC 3/VLR 3). This can be done through the following steps: when the terminal initiates the location update request after roaming to the rural area, the HLR will obtain the virtual VLR number of the rural area, as seen in the location update procedure, the HLR compares the virtual VLR number with the VLR list of the terminal, determining that the virtual VLR number is not in the contracted services, therefore the service of the terminal in this area is limited.

In practical applications, the method of the present invention can be appropriately improved to satisfy the needs of specific scenarios. Therefore, it is understood that the above-mentioned are only the preferred embodiments of the invention and are not used to confine the protection scope of the invention.

The invention claimed is:

1. A method for implementing communications among multiple subnets that are covered by a physical Mobile Switching Center (MSC), comprising:

mapping a physical MSC having a physical MSC number to multiple virtual MSCs that are logical MSCs within the physical MSC, wherein each virtual MSC corresponds to one of the subnets representing a specified location within the physical MSC;

assigning, to each of the virtual MSCs, a virtual MSC number; setting relationships between the subnets corresponding to the virtual MSCs and the virtual MSC numbers assigned to the virtual MSCs;

transmitting a virtual MSC number of one of the virtual MSCs that is currently visited by a mobile wireless terminal when the mobile wireless terminal implements communications;

identifying a subnet that the mobile wireless terminal currently belongs to according to the virtual MSC number of the visited virtual MSC and the set relationship between the subnet that the mobile wireless terminal currently belongs to and the virtual MSC number of the visited virtual MSC; and implementing communications for the mobile wireless terminal over the identified subnet.

2. The method according to claim 1, wherein each subnet covers one or more location areas; and
wherein the method further comprising:
setting a relationship between the location areas covered by each of the virtual MSCs and the virtual MSC number assigned to the virtual MSC.

3. The method according to claim 1, wherein the transmitting of the virtual MSC number comprises:
transmiting the virtual MSC number of the visited virtual MSC to a Home Location Register (HLR) during a location update procedure.

4. The method according to claim 3, wherein the transmitting of the virtual MSC number of the visited virtual MSC to the HLR comprises:
receiving a location update request sent by the mobile wireless terminal, the location update request indicative of a current location area;
determining the virtual MSC number of the visited virtual MSC according to the current location area and the set relationship;
sending the location update request to the HLR, wherein the location update request sent to the HLR carries the virtual MSC number of the visited virtual MSC; and
registering, by the HLR, the virtual MSC number of the visited virtual MSC.

5. The method according to claim 4, further comprising:
sending, by the HLR, a delete location request to an original virtual MSC that the mobile wireless terminal visited;
sending, by the original virtual MSC, a delete location response to the HLR in response to the delete location request;
sending, by the HLR, an insert mobile wireless terminal data request to the visited virtual MSC after receiving the delete location response;
inserting, by the visited virtual MSC, mobile wireless terminal data in response to the insert mobile wireless terminal data request, and sending an insert mobile wireless terminal data response to the HLR; and
sending, by the HLR, a location update response to the visited virtual MSC.

6. The method according to claim 5, wherein, after the visited virtual MSC sends the location update request to the HLR, the method further comprises:
initiating, by the visited virtual MSC, a visiting conflict timer for the mobile wireless terminal; and
after the original virtual MSC receives the delete location request, determining whether the visiting conflict timer is expired;

if the visiting conflict timer is expired, deleting user data corresponding to the mobile wireless terminal, and sending the delete location response to the HLR; and
if the visiting conflict timer is not expired, sending the delete location response to the HLR without deleting the user data corresponding to the mobile wireless terminal.

7. The method according to claim 4, wherein the location update request that is sent to the HLR of the mobile wireless terminal comprises a Super-Charge Supported in Serving Network Entity; the method further comprising sending, by the HLR, the location update response after receiving the location update request.

8. The method according to claim 3, when the mobile wireless terminal roams, the transmitting of the virtual MSC number of the visited virtual MSC further comprising:
sending, by the HLR, a provide roaming number request carrying the virtual MSC number of the visited virtual MSC to a physical Visited Location Register (VLR); and
assigning, by the physical VLR, a roaming number to the mobile wireless terminal according to the virtual MSC number.

9. The method according to claim 8, wherein the identifying of the subnet that the mobile wireless terminal currently belongs to according to the virtual MSC number of the visited virtual MSC and the set relationship, and the implementing of communications for the mobile wireless terminal over the identified subnet, comprises:
obtaining, by a bill center, the roaming number;
detecting, by the bill center, location information of the mobile wireless terminal according to the roaming number and the set relationship; and
implementing, by the bill center, billing for the mobile wireless terminal based on a distance within the physical MSC.

10. The method according to claim 3, when the mobile wireless terminal is a calling party in intelligent services, the transmitting of the virtual MSC number further comprising:
initiating, by the calling party, a call; and
reporting, by the Service Switching Point (SSP), the virtual MSC number of the visited virtual MSC to a Service Control Point (SCP).

11. The method according to claim 10, wherein the identifying of the subnet that the mobile wireless terminal currently belongs to according to the virtual MSC number and the set relationship, and the implementing of communications for the mobile wireless terminal over the identified subnet, comprises:
obtaining, by the SCP, a roaming situation of the calling party according to the roaming number and the set relationship; and
implementing, by the SCP, billing for the calling party.

12. The method according to claim 3, when the mobile wireless terminal is a called party in intelligent services, the transmitting of the virtual MSC number further comprising:
obtaining, by the HLR, the virtual MSC number of the visited virtual MSC after receiving a routing information request;
sending, by the HLR, a routing information response carrying the visited virtual MSC number to the mobile wireless terminal; and
reporting, by the visited virtual MSC the corresponding virtual MSC number of the called party to the SCP.

13. The method according to claim 12, the identifying of the subnet that the mobile wireless terminal currently belongs to according to the virtual MSC number and the set relationship, and the implementing of the communications for the mobile wireless terminal over the identified subnet, comprising:

obtaining, by the SCP, a roaming situation of the called party according to a roaming number and the set relationship; and implementing, by the SCP, billing for the called party.

14. The method according to claim 3, further comprising:

setting a list of MSC numbers for the mobile wireless terminal that are permitted to be visited by the mobile wireless terminal;

wherein when the mobile wireless terminal roams, identifying the subnet that the mobile wireless terminal currently belongs to according to the virtual MSC number and the set relationship, and implementing communications for the mobile wireless terminal over the identified subnet, comprises:

determining whether the virtual MSC number of the visited virtual MSC is in the list of the virtual MSC numbers of the mobile wireless terminal; and restricting services of the mobile wireless terminal if the virtual MSC number of the visited virtual MSC is not in the list.

15. The method according to claim 1, further comprising:

mapping a physical Visited Location Register (VLR) into multiple virtual VLRs;

assigning a virtual VLR number to each virtual VLR; and setting a one-to-one relationship between the virtual MSC numbers and the virtual VLR numbers.

* * * * *